United States Patent
Kim et al.

(10) Patent No.: US 10,592,666 B2
(45) Date of Patent: Mar. 17, 2020

(54) DETECTING ANOMALOUS ENTITIES

(71) Applicant: EntIT Software LLC, Sunnyvale, CA (US)

(72) Inventors: Mijung Kim, Sunnyvale, CA (US); Pratyusa K. Manadhata, Piscataway, NJ (US); Manish Marwah, Palo Alto, CA (US); Alexander Ulanov, Palo Alto, CA (US); Jun Li, Mountain View, CA (US)

(73) Assignee: MICRO FOCUS LLC, Santa Clara, CA (US)

( * ) Notice: Subject to any disclaimer, the term of this patent is extended or adjusted under 35 U.S.C. 154(b) by 115 days.

(21) Appl. No.: 15/692,655

(22) Filed: Aug. 31, 2017

(65) Prior Publication Data
US 2019/0065738 A1    Feb. 28, 2019

(51) Int. Cl.
| | | |
|---|---|---|
| G06F 11/00 | (2006.01) | |
| G06F 21/55 | (2013.01) | |
| G06N 3/08 | (2006.01) | |
| G06F 21/57 | (2013.01) | |
| G06N 3/04 | (2006.01) | |
| G06N 5/02 | (2006.01) | |

(52) U.S. Cl.
CPC .......... G06F 21/552 (2013.01); G06F 21/554 (2013.01); G06F 21/57 (2013.01); G06N 3/0427 (2013.01); G06N 3/0454 (2013.01); G06N 3/08 (2013.01); G06N 5/022 (2013.01)

(58) Field of Classification Search
CPC .... H04L 41/069; H04L 43/12; H04L 63/1408
See application file for complete search history.

(56) References Cited

U.S. PATENT DOCUMENTS

| | | | |
|---|---|---|---|
| 7,739,211 B2 | 6/2010 | Coffman | |
| 9,282,114 B1 | 3/2016 | Dotan | |
| 9,324,119 B2 | 4/2016 | Singh | |
| 9,363,282 B1 | 6/2016 | Yu et al. | |
| 9,516,053 B1 | 12/2016 | Muddu | |
| 9,942,254 B1 | 4/2018 | Averbuch | |
| 2005/0193281 A1 | 9/2005 | Ide | |
| 2008/0306715 A1 | 12/2008 | Tsai | |
| 2009/0150371 A1 | 6/2009 | Dasdan | |
| 2012/0137367 A1 | 5/2012 | Dupont | |
| 2014/0113588 A1* | 4/2014 | Chekina | G06F 21/552 455/410 |
| 2015/0106324 A1 | 4/2015 | Puri | |

(Continued)

FOREIGN PATENT DOCUMENTS

WO    WO-20160138067 A1    9/2016

OTHER PUBLICATIONS

Avivah Litan, "Market Guide for User and Entity Behavior Analytics," Gartner, Sep. 22, 2015; 19 pages.

(Continued)

*Primary Examiner* — Olugbenga O Idowu (57) ABSTRACT

In some examples, a system extracts features from event data representing events in a computing environment, trains ensembles of machine-learning models for respective analytics modules of a plurality of different types of analytics modules, and detects, by the different types of analytics modules using the respective trained ensembles of machine-learning models, an anomalous entity in response to further event data.

21 Claims, 6 Drawing Sheets

(56) References Cited

U.S. PATENT DOCUMENTS

| | | | |
|---|---|---|---|
| 2015/0215329 A1 | 7/2015 | Singla | |
| 2015/0227741 A1* | 8/2015 | Permeh | G06F 21/51 726/22 |
| 2016/0092774 A1 | 3/2016 | Wang | |
| 2016/0147583 A1 | 5/2016 | Ben Simhon | |
| 2016/0253495 A1 | 9/2016 | Kolacinski | |
| 2016/0359685 A1 | 12/2016 | Yadav | |
| 2016/0359719 A1 | 12/2016 | Travostino | |
| 2016/0364794 A1 | 12/2016 | Chari | |
| 2017/0063911 A1 | 3/2017 | Muddu et al. | |
| 2017/0118240 A1 | 4/2017 | Devi Reddy | |
| 2018/0053207 A1 | 2/2018 | Modani | |
| 2018/0219888 A1* | 8/2018 | Apostolopoulos | G06F 16/9024 |
| 2018/0357555 A1 | 12/2018 | Goldschmidt | |

OTHER PUBLICATIONS

Bar-Yossef et al., Local Approximation of PageRank and Reverse PageRank, CIKM Oct. 2008 (10 pages).
Dong, B. et al.; GID: Graph-based Intrusion Detection on Massive Process Traces for Enterprise Security Systems; https://arxiv.org/pdf/1608.02639.pdf; Aug. 8, 2016; 11 pages.
ESG: Mcafee Next Generation Siem: https://www.mcafee.com/us/resources/reports/rp-esg-lab-validation-next-gen-siem.pdf; Apr. 2015; 23 pages.
Hassanzadeh, R.; Anomaly Detection in Online Social Networks: Using Datamining Techniques and Fuzzy Logic; http://eprints.qut.edu.au/7867911/Reza_Hassanzaden_Thesis.pdf; Nov 2014; 225 pages.
https://nlp.stanford.edu/IRbook/html/htmledition/linearalgebrareview-1.html—Linear algebra review, 2008 (5 pages).
Laptev, N. et al., Generic and Scalable Framework for Automated Time-series Anomaly Detection, 2015—http://dl.acm.org/citation.cfm?id=2788611 (9 pages).
Marwah et al., U.S. Appl. No. 15/596,042 entitled Anomalous Entity Determinations, filed May 16, 2017 (44 pages).
Pratyusa K. Manadhata et al., U.S. Appl. No. 15/596,041 entitled Risk Scores for Entities, filed May 16, 2017 (32 pages).
Preempt Security; Preempt Emerges From Stealth with Behavioral Firewall; https://www.preempt.com/press/preempt-introduces-behavioral-firewall/; Jun. 13, 2016; 2 pages.
Ranshous, S. et al.; Anomaly Detection in Dynamic Network:A Survey: https://repository.lib.ncsu.edu/bitstream/handle/1840.2/2575/anomaly_detection_surbey.pdf?sequence=1 ; 2015; 27 pages.
Rogers, Ian, The Google PageRank Algorithm and How It Works dated on or before Apr. 8, 2017 (18 pages).
SAS, Deep Learning, What it is and why it matters—ttps://www.sas.com/en_us/insights/analytics/deep-learning.html downloaded Aug. 23, 2017 (12 pages).
SECURONIX, UEBA 6.0—Powered by Machine Learning That Detects Any Threat, Anytime, Anywhere downloaded Aug. 22, 2017 (9 pages).
Splunk, Tech Brief, Using Splunk User Behavior Analytics, Automating early breach detection and continuous threat monitoring downloaded Aug. 22, 2017 (2 pages).
VASA Virtual Advisor to Security Analysts; Data Science Driven Behavioral Analytics; https://www.ranksoftwareinc.com/vasa; 2017; 2 pages.
Wikipedia, Degree (graph theory) last modified Nov. 24, 2016 (5 pages).
Wikipedia, Hits algorithm last modified Jul. 8, 2016 (7 pages).
Wikipedia, PageRank last modified Apr. 8, 2017 (28 pages).
Wikipedia, Parametric statistics last modified Dec. 8, 2016 (3 pages).
Wikipedia, Power law last modified Mar. 27, 2017 (18 pages).
www.niara.com—Behavioral Analytics, https://www.niara.com/products/advanced-analytics/—2016 (7 pages).

\* cited by examiner

DETECTING ANOMALOUS ENTITIES

BACKGROUND

A computing environment can include a network of computers and other types of devices. Issues can arise in the computing environment due to behaviors of various entities. Monitoring can be performed to detect such issues, and to take action to address the issues.

BRIEF DESCRIPTION OF THE DRAWINGS

Some implementations of the present disclosure are described with respect to the following figures.

Throughout the drawings, identical reference numbers designate similar, but not necessarily identical, elements. The figures are not necessarily to scale, and the size of some parts may be exaggerated to more clearly illustrate the example shown. Moreover, the drawings provide examples and/or implementations consistent with the description; however, the description is not limited to the examples and/or implementations provided in the drawings.

DETAILED DESCRIPTION

In the present disclosure, use of the term "a," "an", or "the" is intended to include the plural forms as well, unless the context clearly indicates otherwise. Also, the term "includes," "including," "comprises," "comprising," "have," or "having" when used in this disclosure specifies the presence of the stated elements, but do not preclude the presence or addition of other elements.

Certain behaviors of entities in a computing environment can be considered anomalous. Examples of entities can include users, machines (physical machines or virtual machines), programs, sites, network addresses, network ports, domain names, organizations, geographical jurisdictions (e.g., countries, states, cities, etc.), or any other identifiable element that can exhibit a behavior including actions in the computing environment. A behavior of an entity can be anomalous if the behavior deviates from an expected rule, criterion, threshold, policy, past behavior of the entity, behavior of other entities, or any other target, which can be predefined or dynamically set. An example of an anomalous behavior of a user involves the user making greater than a number of login attempts into a computer within a specified time interval, or a number of failed login attempts by the user within a specified time interval. An example of an anomalous behavior of a machine involves the machine receiving greater than a threshold number of data packets within a specified time interval, or a number of login attempts by users on the machine that exceed a threshold within a specified time interval.

Analysis can be performed to identify anomalous entities, which may be entities that are engaging in behavior that present a risk to a computing environment. In some examples, such analysis can be referred to as a User and Entity Behavior Analysis (UEBA). As examples, a UEBA system can use behavioral anomaly detection to detect a compromised user, a malicious insider, a malware infected device, a malicious domain name or network address (such as an Internet Protocol or IP address), and so forth.

A challenge faced by a UEBA system is a scalable framework for data collection, storage, analysis, and visualization. In a large network with a large number of entities, the amount of event data to be processed can be large. Processing a large amount of event data if not performed in an efficient manner can lead to delays in detecting anomalous entities. As a network grows, a UEBA system that does not scale well may be unable to handle the growth in the amount of event data that has to be processed.

In accordance with some implementations of the present disclosure, techniques or systems provide a scalable framework that allows for timely online analysis of event data for detecting anomalous entities. Event data can be aggregated in respective time intervals to reduce the amount of event data that has to be processed to extract features for training machine-learning models to assist in detecting anomalous entities. Also, for enhanced flexibility and accuracy in detecting anomalous entities, different types of analytics modules can be used, where each respective analytics module can be associated with an ensemble of machine-learning models. The respective analytics module uses the respective ensemble of machine-learning models to detect anomalous entities.

Figure 1:
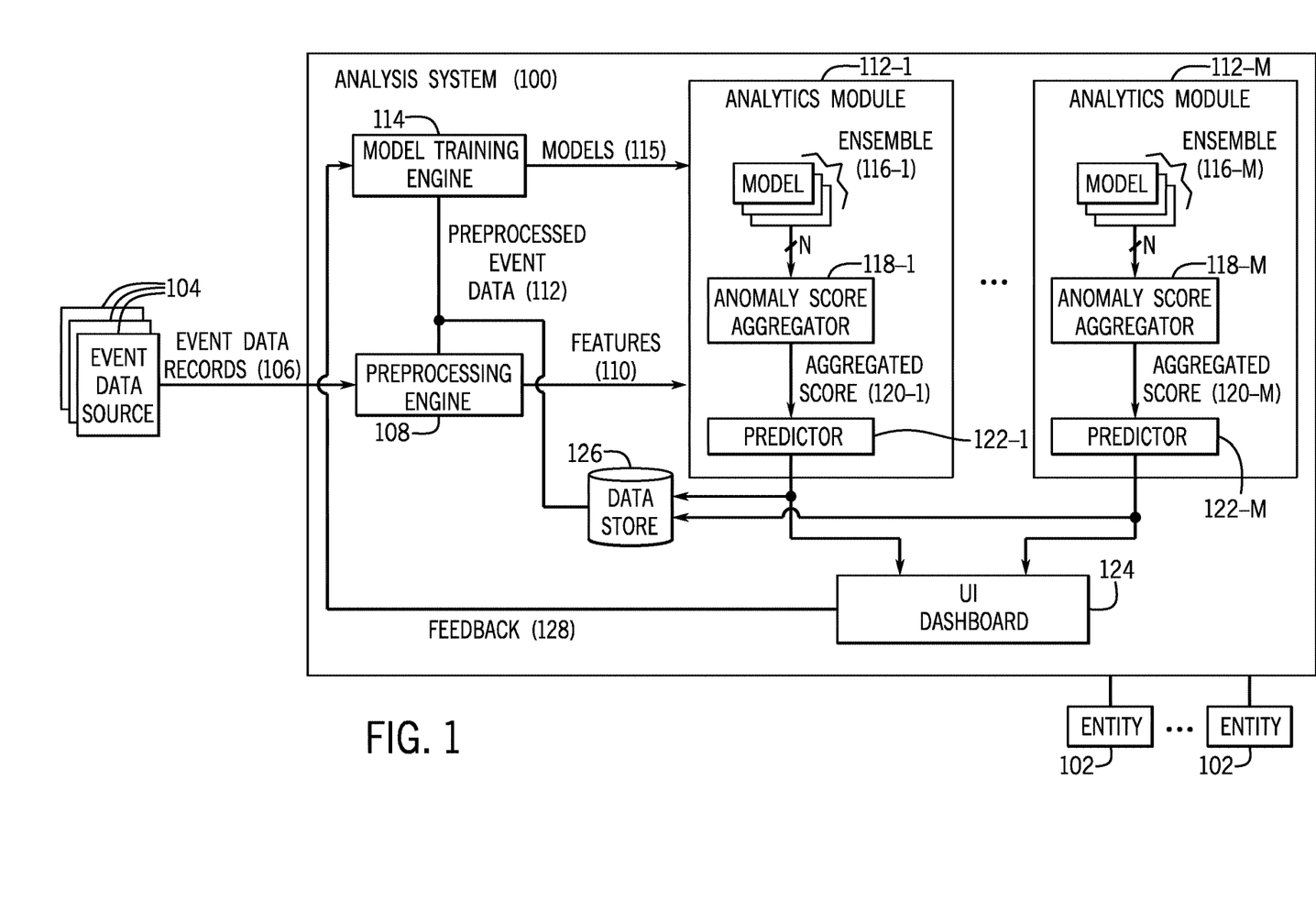
FIG. 1 is a block diagram of an arrangement including an analysis system to determine anomalous entities according to some examples.

FIG. 1 is a block diagram of an example arrangement that includes an analysis system 100 and a number of entities 102, where the entities 102 can include any of the entities noted above. In some examples, the entities 102 can be part of an organization, such as a company, a government agency, an educational organization, or any other type of organization. In other examples, the entities 102 can be part of multiple organizations. The analysis system 100 can be operated by an organization that is different from the organization(s) associated with the entities 102. In other examples, the analysis system 100 can be operated by the same organization associated with the entities 102.

In some examples, the analysis system 100 can include a UEBA system. In other examples, the analysis system 100 can include an Enterprise Security Management (ESM) system, which provides a security management framework that can create and sustain security for a computing infrastructure of an organization. In other examples, other types of analysis systems 100 can be employed.

The analysis system 100 can be implemented as a computer system or as a distributed arrangement of computer systems. More generally, the various components of the analysis system 100 can be integrated into one computer system or can be distributed across various different computer systems.

In some examples, the entities 102 can be part of a computing environment, which can include computers, communication nodes (e.g., switches, routers, etc.), storage devices, servers, and/or other types of electronic devices.

The computing environment can also include additional entities, such as programs, users, network addresses assigned to entities, domain names of entities, and so forth. The computing environment can be a data center, an information technology (IT) infrastructure, a cloud system, or any other type of arrangement that includes electronic devices and programs and users associated with such electronic devices and programs.

The analysis system 100 receives event data from event data sources 104 that collect event data relating to events associated with the entities 102 of the computing environment. The event data sources 104 can include collection agents (in the form of machine-readable instructions such as software or firmware modules, for example) distributed throughout the computing environment, such as on computers, communication nodes, storage devices, servers, and so forth. Alternatively, some of the event data sources 104 can include hardware event collectors implemented with hardware circuitry.

Examples of events can include login events (e.g., events relating to a number of login attempts and/or devices logged into), events relating to access of resources such as websites, events relating to submission of queries such as Domain Name System (DNS) queries, events relating to sizes and/or locations of data (e.g., files) accessed, events relating to loading of programs, events relating to execution of programs, events relating to accesses made of components of the computing environment, errors reported by machines or programs, events relating to performance monitoring of various characteristics of the computing environment (including monitoring of network communication speeds, execution speeds of programs, etc.), and/or other events.

An event data record can include various attributes, such as a time attribute (to indicate when the event occurred), and further attributes that can depend on the type of event that the event data record represents. For example, if an event data record is to present a login event, then the event data record can include a time attribute to indicate when the login occurred, a user identification attribute to identify the user making the login attempt, a resource identification attribute to identify a resource in which the login attempt was made, and so forth.

Event data can include network event data and/or host event data. Network event data is collected on a network device such as a router, a switch, or other communication device that is used to transfer data between other devices. An event data collector 104 can reside in the network device, or alternatively, the event data collector can be in the form of a tapping device that is inserted into a network. Examples of network event data include Hypertext Transfer Protocol (HTTP) data, DNS data, Netflow data (which is data collected according to the Netflow protocol), and so forth.

Host event data can include data collected on computers (e.g., desktop computers, notebook computers, tablet computers, server computers, etc.), smartphones, or other types of devices. Host event data can include information of processes, files, applications, operating systems, and so forth.

The event data sources 104 can produce a stream of event data records 106, which can be provided to a preprocessing engine 108 for preprocessing of the event data records 106. As used here, an "engine" can refer to a hardware processing circuit or a combination of a hardware processing circuit and machine-readable instructions (e.g., software and/or firmware) executable on the hardware processing circuit. The hardware processing circuit can include any or some combination of the following: a microprocessor, a core of a multi-core microprocessor, a microcontroller, a programmable gate array, a programmable integrated circuit device, and so forth.

A "stream" of event data records can refer to any set of event data records that can have some ordering, such as ordering by time of the event data records, ordering by location of the event data records, or some other attribute(s) of the event data records. An event data record can refer to any collection of information that can include information pertaining to a respective event.

The processing of the event data records 106 by the analysis system 100 can be performed in an "online" manner. "Online" processing of the stream of event data records 106 can refer to processing the stream of event data records 106 as the event data records 106 are received by the analysis system 100.

Alternatively or additionally, the event data records 106 produced by the event data sources 104 can be first stored into a repository of event data records (not shown), and the preprocessing engine 108 can retrieve the event data records from the repository to process such event data records. The repository can be implemented with a storage medium, which can be provided by disk-based storage device(s), solid state storage device(s), and/or other type(s) of storage or memory device(s).

The preprocessing that is performed by the preprocessing engine 108 can include any or some combination of the following: converting an event in the data records from a first format to a second format, filtering event data records to remove event data records that do not match a filtering criterion, aggregating event data records, and so forth.

In some examples, the preprocessing engine 108 can also extract features 110 from the event data records 106, and the extracted features 110 can be provided to analytics modules 112 (112-1 to 112-M shown, where M>1) for detection of anomalous entities (from among the entities 102).

The preprocessing engine 108 further provides preprocessed event data 112 to a model training engine 114, which is used to train machine-learning models for use in detecting anomalous entities. As used here, a machine-learning model can refer to a classifier that can be applied on features extracted from event data for producing an indication of whether or not the features are indicative of an anomalous entity.

A "feature" can refer to any characteristic that is extracted from event data associated with an authentication event. The feature can include an attribute retrieved from the event data, or an attribute computed based on the event data. In either case, the feature is considered to be extracted from event data.

A trained machine-learning model (classifier) is applied on a collection of features (e.g., a feature vector) associated with events, and the machine-learning model produces an output relating to whether or not the collection of features is positive or negative with respect to an anomalous entity classification. If the output is positive with respect to the anomalous entity classification, then the collection of features indicates that the corresponding event is associated with an anomalous entity. If the output from the machine-learning model is negative with respect to the anomalous entity classification, then the collection of features is indicative of the event not corresponding to an anomalous entity.

The model training engine 114 can extract features from the preprocessed event data 112. Although reference is made to the model training engine 114 being able to extract features from the preprocessed event data 112, it is noted that in other examples, the model training engine 114 can use the features 110 extracted by the preprocessing engine 108.

To build a training data set to train (learn) machine-learning models, the extracted features can be assigned labels indicating whether or not each collection of features (e.g., a feature vector) is indicative of an anomalous entity. The label can be assigned by a user, a program, or a machine. A positive label specifies that the collection of features is indicative of an anomalous entity, while a negative label specifies that the collection of features is not indicative of an anomalous entity. The extracted collections of features and their respective assigned labels form the training data set that can be used by the model training engine 114 to train respective machine-learning models 115

The trained machine-learning models 115 can be used by the respective analytic modules 112-1 to 112-1M. As shown in FIG. 1, each analytic module 112 (one of 112-1 to 112-M) uses a respective ensemble 116 (one of 116-1 to 116-M) of machine-learning models. For example, the analytics module 112-1 uses the ensemble 116-1 of machine-learning models, while the analytics module 112-M uses the ensemble 116-M of machine-learning models.

The analytics modules 112-1 to 112-M are different types of analytics modules that apply respective different types of techniques for detecting anomalous entities in the computing environment. For example, the analytics module 112-1 can be a graph-based analytics module, which uses graph models (that are part of the respective ensemble 116-1 of machine-learning models), to produce indications of whether or not collections of features are indicative of an anomalous entity. A graph-based model is a model that represents collections of features as nodes and/or links between nodes in a graph. The nodes of the graph are interconnected by links, and each link represents a relationship between a pair of collections of features. The nodes and links of the graph are learned as part of the training performed by the model training engine 114.

In some examples, the different graph models of the ensemble 116-1 of machine-learning models can be produced by sampling different portions of a training data set. For example, a first subset of samples of the training data set can be used to produce a first graph model, a second subset of the training data set can be used to produce a second graph model, and so forth. In other examples, the different graph models of the ensemble 116-1 of machine-learning models can be produced using different learning techniques during the training phase by the model training engine 114.

Another analytics module 112 can be a deep learning analytics module. A deep learning technique uses models that are trained at multiple different layers. For example, a deep learning technique can use deep learning models formed with neural networks that have multiple layers. The different deep learning models of an ensemble of machine-learning models used by a deep learning analytics module can be produced by sampling different portions of the training data set or by using different learning techniques.

In further examples, another of the analytics modules can be a profile-based analytics module. Each model of the respective ensemble of machine-learning models used by the profile-based module represents a profile of activities represented by event data.

Each machine-learning model of an ensemble of machine-learning models produces an indication, such as a score, indicating whether or not a collection of features is indicative of an anomalous entity. As depicted in FIG. 1, each ensemble of machine-learning models includes N (N>1) machine-learning models, which when applied on a collection of features produce respective N scores.

Although FIG. 1 shows an example in which each ensemble includes N machine-learning models, it is noted that in other examples, a first analytics module can use a first ensemble that has a first number of machine-learning models, while a second analytics module can use a second ensemble that has a second number of machine-learning models, where the second number is different from the first number.

Each analytics module 112 (one of 112-1 to 112-M) includes a respective anomaly score aggregator 118 (one of anomaly score aggregators 118-1 to 118-M shown in FIG. 1). The anomaly score aggregator 118 receives the N scores from the machine-learning models of the ensemble 116, and produces an aggregated score 120 (one of aggregated scores 120-1 to 120-M shown in FIG. 1). For example, the anomaly score aggregator 118 can calculate a sum, an average, a median, a maximum, a minimum, or any other mathematical aggregate of the N scores from the machine-learning models of the ensemble 116.

The aggregated score 120 is provided to a respective predictor 122 (a respective one of predictors 122-1 to 122-M shown in FIG. 1) to predict, based on the aggregated score 120, whether the received event data is associated with an anomalous entity. For example, if the aggregated score 120 has a first relationship with respect to a specified threshold, then the predictor 122 produces an indication that the corresponding entity is anomalous. This first relationship can be a less than or greater than relationship, for example. If the aggregated score 120 has a second relationship with respect to the specified threshold, then the predictor 122 provides an indication that the corresponding entity is not anomalous. The second relationship can be a greater than or less than relationship.

Each anomaly score aggregator 118 can produce multiple respective aggregated scores 120 for corresponding multiple entities. The predictor 122 can rank the entities based on the respective aggregated scores, to produce a ranked list of anomalous entities. For example, an entity at the top of the ranked list can be one that has a greater likelihood of being anomalous than an entity at the bottom of the ranked list.

The predictors 122-1 to 122-M produce outputs that are provided to a user interface (UI) dashboard 124. The UI dashboard 124 can be a graphical user interface (GUI) displayed by a display device of a computer, for example. Each predictor 122 can produce an output that includes a ranked list of anomalous entities, or alternatively, the output from the predictor 122 can include the identification of just one entity that is indicated as being anomalous. In further examples, the output from the predictor 122 can also identify an entity that is not considered to be anomalous.

The analysis system 100 also includes a data store 126, which stores preprocessed event data 112 and respective predictions made by the analytics modules 112-1 to 112-M with respect to the preprocessed event data. The data store 126 can be stored in a storage device or a distributed arrangement of storage devices. By storing the event data and respective predictions in the data store 126, queries can be later made with respect to the data store 126 to retrieve historical events and their predictions.

Using the UI dashboard 124, a user can provide feedback 128 regarding predictions made by the analytics modules 112-1 to 112-M. Such feedback can indicate whether or not a prediction of an anomalous entity was accurate. The feedback 128 can be used by the model training engine 114 to update the machine-learning models of the respective analytics modules 112-1 to 112-M.

In further examples, in response to detecting an anomalous entity, the analysis system 100 can take action to address the anomalous entity. For example, the analysis system 100 can disable access by the anomalous entity of a network, can disable access of or communication with the anomalous entity, disable programs or machines, shut down programs or machines, and so forth.

Figure 2:
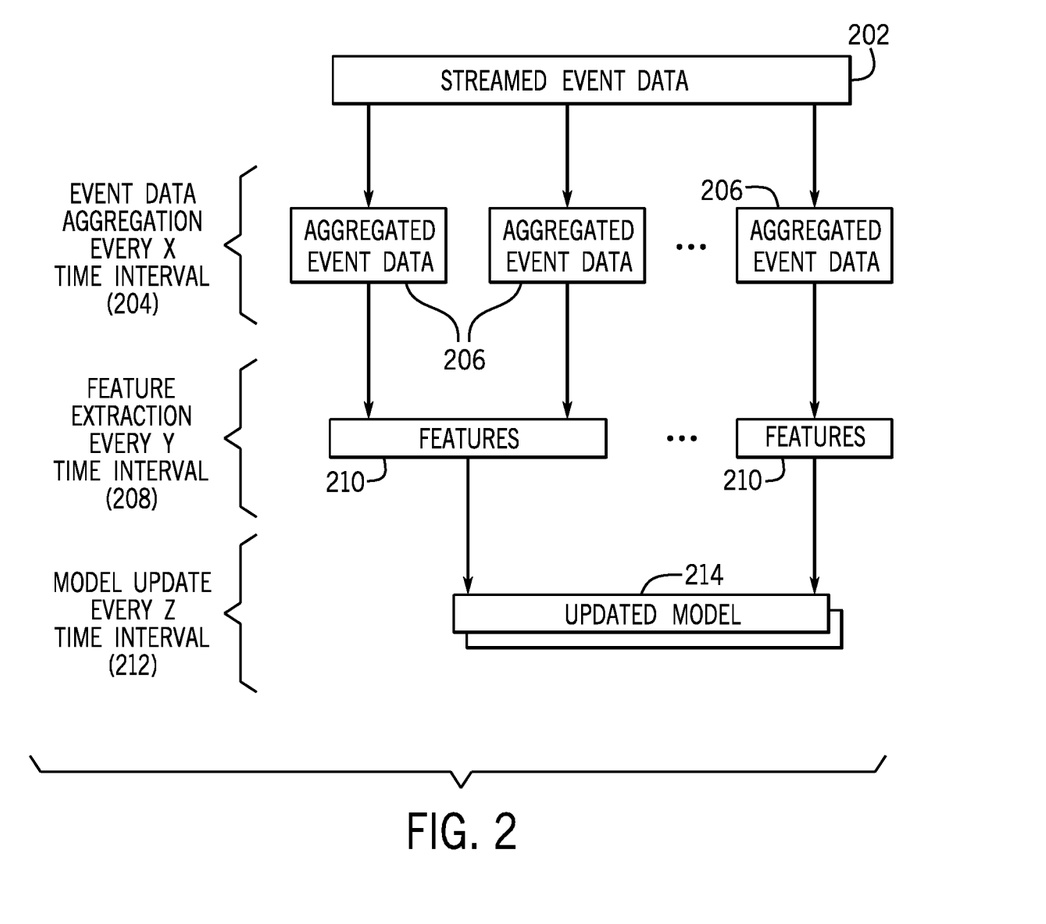
FIG. 2 is a block diagram illustrating various different tasks performed by an analysis system according to some examples.

FIG. 2 shows various tasks that can be performed by the analysis system 100 in response to streamed event data 202 (including a stream of event data records) received by the analysis system 100. Event data aggregation 204 can be performed every X time interval, where X can be a specified value. The event data aggregation 204 can be performed by the preprocessing engine 108 (FIG. 1). From the streamed event data 202, the event data aggregation 204 produces aggregated event data 206. Aggregation of event data can refer to combining event data records, such as by summing or averaging or calculating some other aggregate of respective attributes in the event data records.

Feature extraction 208 can be performed every Y time interval, where Y is a specified value. The feature extraction 208 can be performed by the preprocessing engine 108 and/or the model training engine 114, as noted above. The feature extraction 208 extracts features 210 from the aggregated event data 206.

A model update 212 can be performed every Z time interval where Z is a specified value. In the foregoing example, X, Y, and Z can be different from one another, or can have the same value. The model update 212 can be performed by the model training engine 114, and produces updated models 214. The model update 212 is performed repeatedly as additional event data is continually received by the analysis system 100.

Although not shown, the features 210 can also be used by the analytics modules 112-1 to 112-M to perform predictions of anomalous entities.

Figure 3:
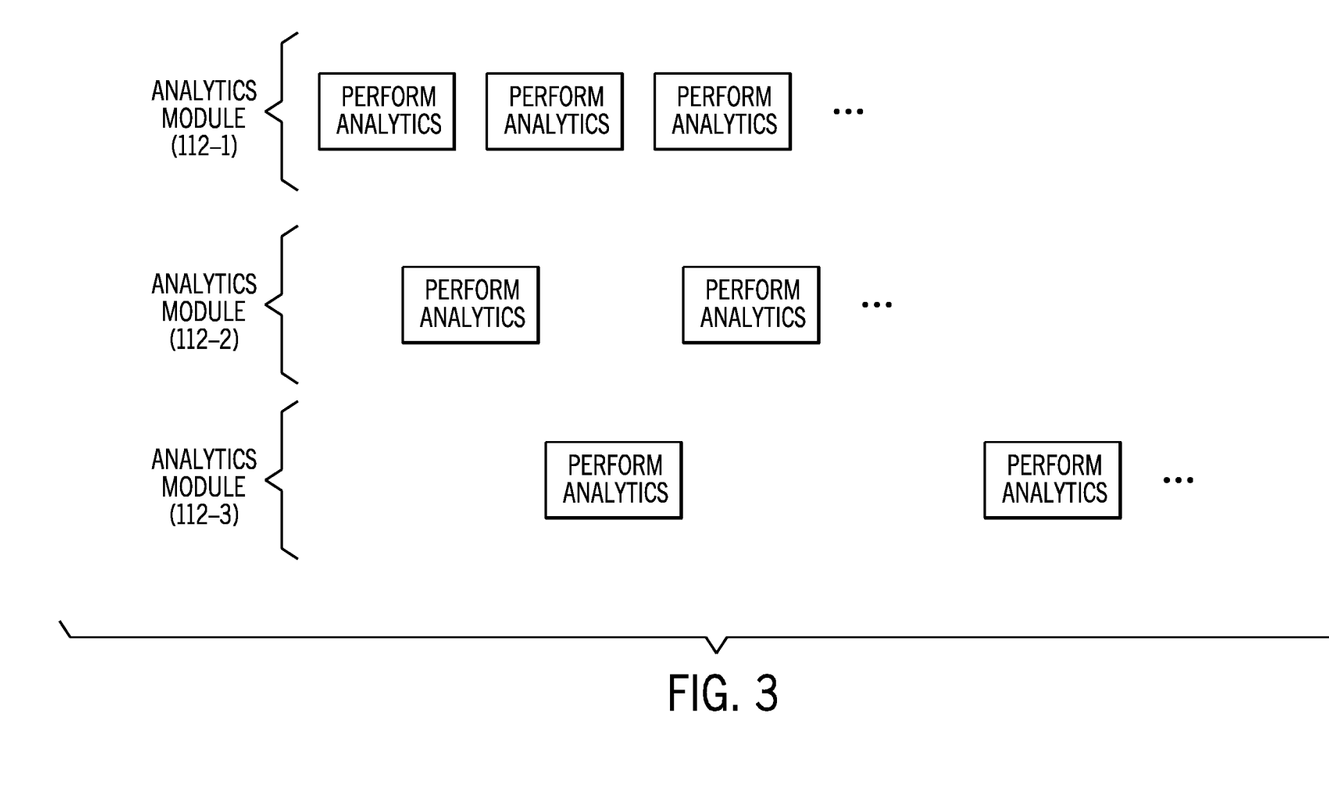
FIG. 3 illustrates performance of analytics by different types of analytics modules according to different time scales, in accordance with further examples.

In some examples, the analytics modules 112-1 to 112-M can perform analytics at respective different time scales. Performing analytics at a given time scale refers to repeating the analytics every time interval represented by the given time scale (e.g., performing the analytics by the analytics module every x minutes).

As shown in FIG. 3, the analytic module 112-1 performs analytics at a first time scale (e.g., every 10 minutes), the analytics module 112-2 performs analytics at a second time scale (e.g., every 30 minutes), and the analytics module 112-3 performs analytics according to a third time scale (e.g., every 2 hours). In some examples, priorities can be assigned to the analytics modules 112-1, 112-2 and 112-3 based on the respective time scales of the analytics modules. For example, an analytics module that has a smaller time scale (e.g., such as the analytics module 112-1) is assigned a higher priority, such that the analytics module 112-1 is executed with higher priority than another analytics module (e.g., 112-2 or 112-3) that has a lower priority due to a larger time scale. Executing a given analytics module with higher priority can refer to providing the given analytics module with prioritized access to system resources to execute the given analytics module, over another analytics module with a lower priority.

Figure 4:
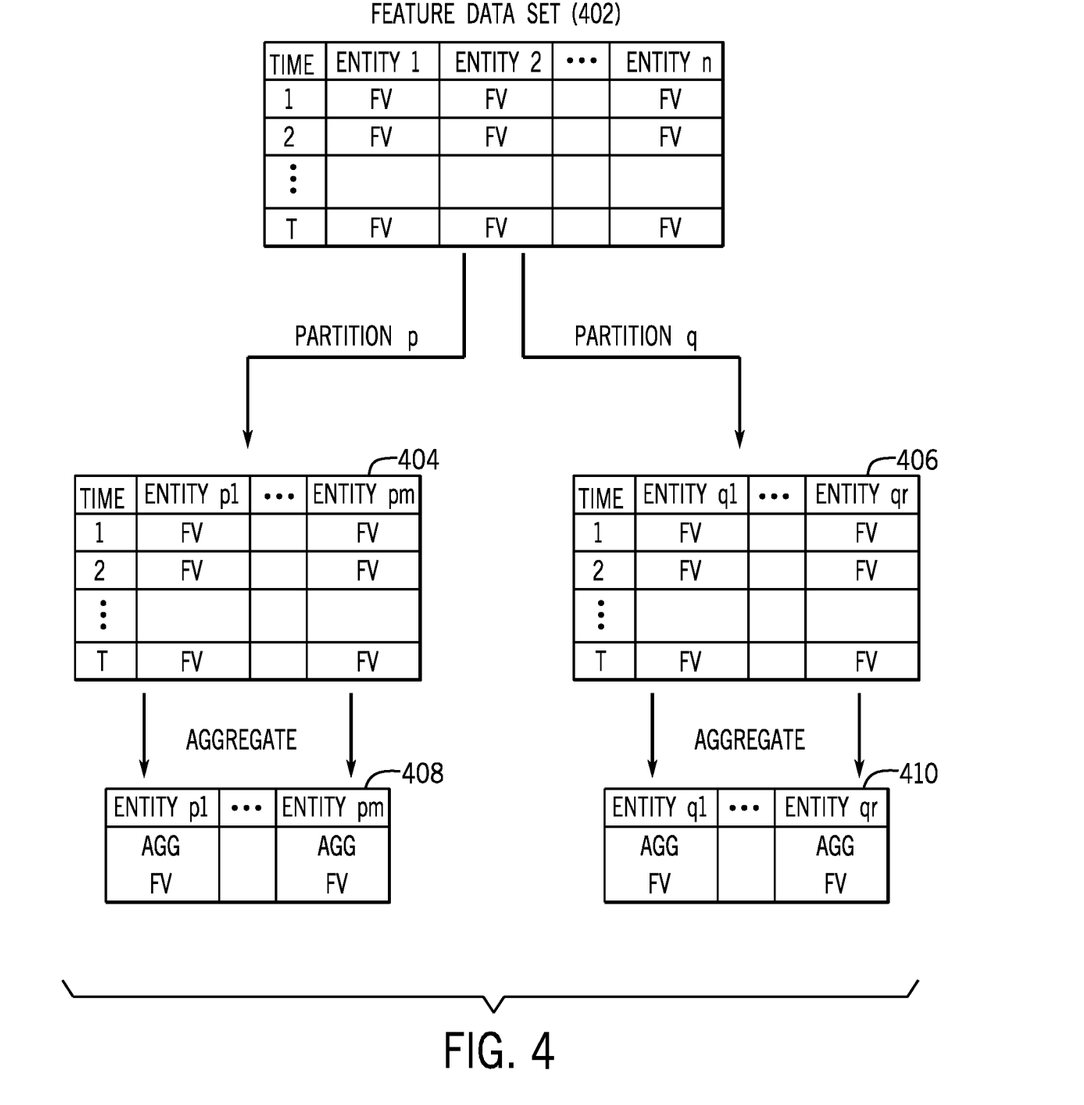
FIG. 4 illustrates aggregating and partitioning features, according to additional examples.

In some examples, temporal-based feature updates can be performed, such as shown according to FIG. 4. In FIG. 4, a feature data set 402 includes feature vectors (FV) collected for multiple entities (entity 1 to entity n) extracted at respective different times (1, 2, . . . T). The feature data set 402 can be partitioned into partition p and partition q, to produce a first partitioned feature data set 404 and a second partitioned feature data set 406, respectively.

Partition p corresponds to a first subset of entities p1 to pm (of the entities 1, 2, . . . n in the feature data set 402). The second partition 406 corresponds to a second subset of entities q1 to qr (from among the entities 1, 2, . . . , n).

From the first partitioned feature data set 404, the feature vectors for the respective entities p1 to pm acquired at respective times 1, 2, . . . , T, can be aggregated to produce an aggregated feature data set 408. More specifically, the feature vectors at times 1, 2, . . . , T of the first partitioned feature data set 404 for entity p1 are aggregated to produce an aggregated feature vector (AGG FV) for entity p1. Similarly, the feature vectors at times 1, 2, . . . , T of the first partitioned feature data set 404 for entity pm are aggregated to produce an aggregated feature vector (AGG FV) for entity pm.

Similarly, the feature vectors for entities q1 to qr in the second partitioned feature data set 406 can be aggregated to produce an aggregated feature data set 410 for the respective entities q1 to qr.

The aggregated feature vectors of the aggregated feature data sets 408 and 410 can be used to train models or for application by trained models. By partitioning feature vectors for different entities, the model training and application can be performed in parallel by system resources for the different entities. In addition, by aggregating feature vectors, a larger number of feature vectors can be reduced to a smaller number of feature vectors so that more efficient model training or application can be performed.

Figure 5:
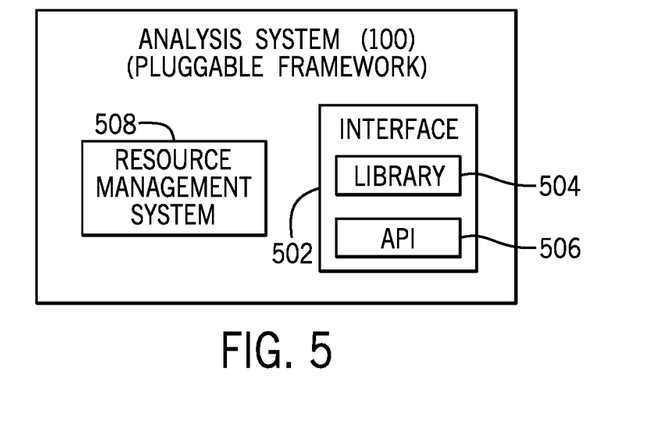
FIG. 5 is a block diagram of an analysis system providing a pluggable framework according to further examples.

In some examples, the analysis system 100 provides a pluggable framework (as shown in FIG. 5), where additional modules can be added to the analysis system 100 to scale the analysis system 100 for processing event data of a larger computing environment, such as due to growth of the computing environment. For example, additional analytics modules can be added by plugging the analytics modules into the analysis system 100. In some examples, the analysis system 100 can present an interface 502, which can include a library 504 of routines and/or an application programming interface (API) 506. The interface 502 can be used by program developers to generate an analytics module that can then be plugged into the analysis system 100.

The analysis system 100 can also include a resource management engine 508, which can manage the resources (e.g., processing resources, storage resources, communication resources, etc.) of the analysis system 100. The resource management engine 508 can schedule analytics modules to be executed on the resources. For example, the scheduling can be based on priorities assigned to the analytics modules.

Figure 6:
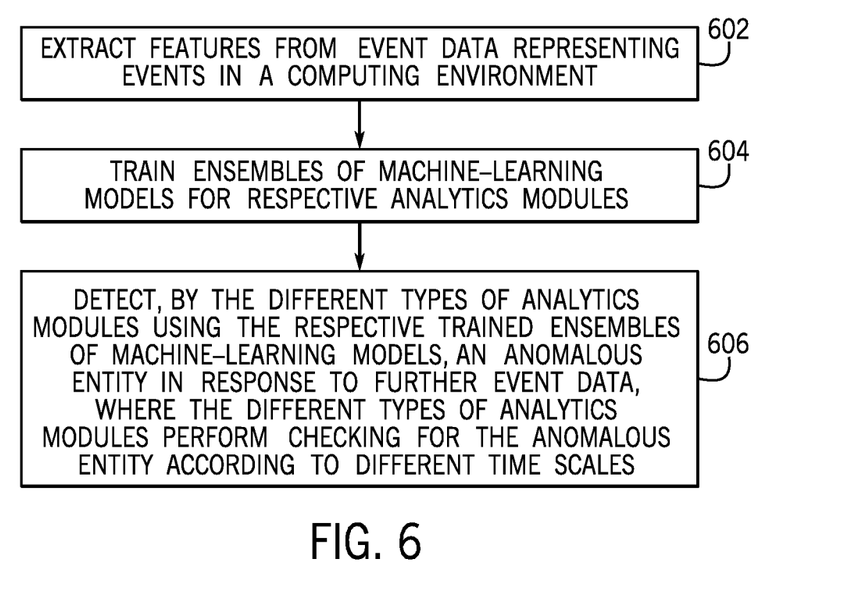
FIG. 6 is a flow diagram of a process of detecting an anomalous entity according to some examples.

FIG. 6 is a flow diagram of a process that can be performed by the analysis system 100, for example. The process includes extracting (at 602) features from event data representing events in a computing environment.

The process further includes training (at 604) ensembles of machine-learning models for respective analytics modules of a plurality of different types of analytics modules (such as 112-1 to 112-M shown in FIG. 1).

The process further includes detecting (at 606), by the different types of analytics modules using the respective trained ensembles of machine-learning models, an anomalous entity in response to further event data, wherein the different types of analytics modules perform checking for the anomalous entity according to different time scales.

Figure 7:
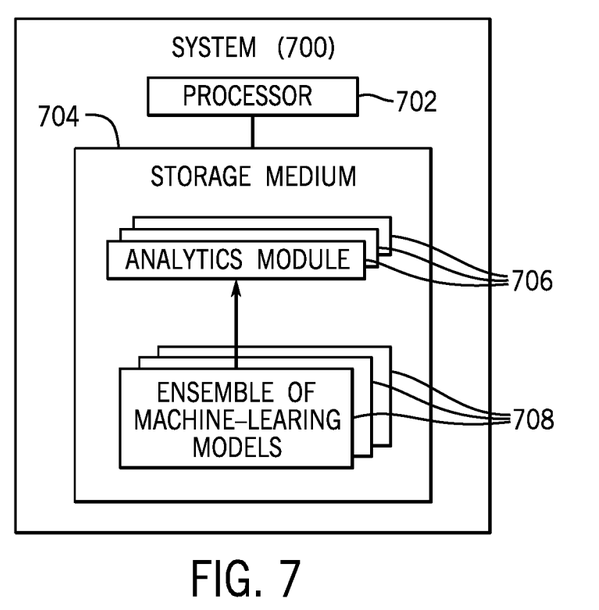
FIG. 7 is a block diagram of a system according to additional examples.

FIG. 7 is a block diagram of a system 700 according to further examples. The system 700 includes a processor (or multiple processors) 702. The system 700 further includes a non-transitory machine-readable or computer-readable storage medium 704 storing machine-readable instructions that are executable on the processor 702 to perform various tasks. Machine-readable instructions executable on a processor to perform a task can refer to machine-readable instructions executable on a single processor or on multiple processors to perform the task. A processor can include a microprocessor, a core of a multi-core microprocessor, a microcontroller, a programmable integrated circuit, a programmable gate array, or another hardware processing circuit.

The machine-readable instructions include analytics modules 706 executable on the processor 702 to apply different types of techniques for detecting anomalous entities in a computing environment. The machine-readable instructions further include a plurality of ensembles 708 of machine-learning models, each respective ensemble of machine-learning models associated with a respective analytics module 706. The respective analytics module 706 uses the respective ensemble 708 of machine-learning models to detect an anomalous entity in the computing environment based on features extracted from event data representing events in the computing environment.

Figure 8:
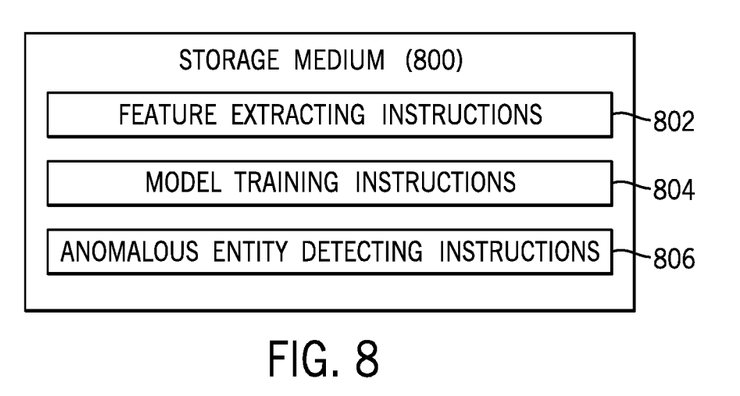
FIG. 8 is a block diagram of a storage medium storing machine-readable instructions according to further examples.

FIG. 8 is a block diagram of a non-transitory machine-readable or computer-readable storage medium 800 storing machine-readable instructions that upon execution cause a system to perform various tasks. The machine-readable instructions include feature extracting instructions 802 to extract features from event data representing events in a computing environment. The machine-readable instructions further include model training instructions 804 to train ensembles of machine-learning models for respective analytics modules of a plurality of different types of analytics modules. The machine-readable instructions further include anomalous entity detecting instructions 806 to detect, by the different types of analytics modules using the respective trained ensembles of machine-learning models, an anomalous entity in response to further event data.

The storage medium 704 (FIG. 7) or 800 (FIG. 8) can include any or some combination of the following: a semiconductor memory device such as a dynamic or static random access memory (a DRAM or SRAM), an erasable and programmable read-only memory (EPROM), an electrically erasable and programmable read-only memory (EEPROM) and flash memory; a magnetic disk such as a fixed, floppy and removable disk; another magnetic medium including tape; an optical medium such as a compact disk (CD) or a digital video disk (DVD); or another type of storage device. Note that the instructions discussed above can be provided on one computer-readable or machine-readable storage medium, or alternatively, can be provided on multiple computer-readable or machine-readable storage media distributed in a large system having possibly plural nodes. Such computer-readable or machine-readable storage medium or media is (are) considered to be part of an article (or article of manufacture). An article or article of manufacture can refer to any manufactured single component or multiple components. The storage medium or media can be located either in the machine running the machine-readable instructions, or located at a remote site from which machine-readable instructions can be downloaded over a network for execution.

In the foregoing description, numerous details are set forth to provide an understanding of the subject disclosed herein. However, implementations may be practiced without some of these details. Other implementations may include modifications and variations from the details discussed above. It is intended that the appended claims cover such modifications and variations.

What is claimed is:

1. A non-transitory machine-readable storage medium storing instructions that upon execution cause a system to:
   extract features from event data representing events in a computing environment;
   train, using the extracted features, ensembles of machine-learning models for respective analytics modules of a plurality of different types of analytics modules;
   assign different priorities to the respective analytics modules of the different types of analytics modules, wherein the different priorities are based on different time scales used by the different types of analytics modules; and
   detect, by the different types of analytics modules using the respective trained ensembles of machine-learning models, an anomalous entity in response to further event data, wherein the different types of analytics modules check for presence of the anomalous entity using respective time scales of the different time scales, and wherein a first analytics module of the different types of analytics modules is given a higher priority in access of system resources than a second analytics module of the different types of analytics modules responsive to the first analytics module being assigned a higher priority than the second analytics module by the assigning.

2. The non-transitory machine-readable storage medium of claim 1, wherein execution of the different types of analytics modules are according to respective priorities of the different priorities.

3. The non-transitory machine-readable storage medium of claim 1, wherein the instructions upon execution cause the system to:
   aggregate, by the first analytics module, anomaly scores produced by machine-learning models of a first ensemble of machine-learning models, the first ensemble of machine-learning models being an ensemble of the trained ensembles of machine-learning models.

4. The non-transitory machine-readable storage medium of claim 1, wherein the different types of analytics modules comprise analytics modules selected from among a graph-based analytics module, a deep learning analytics module, and a profile-based analytics module.

5. The non-transitory machine-readable storage medium of claim 1, wherein the instructions upon execution cause the system to:
   present, in a user interface, a representation of the anomalous entity identified by a given analytics module of the different types of analytics modules; and
   receive feedback regarding an accuracy of the identification of the anomalous entity identified by the given analytics module.

6. The non-transitory machine-readable storage medium of claim 5, wherein the instructions upon execution cause the system to:
   in response to the feedback, update the ensemble of machine-learning models for the given analytics module.

7. The non-transitory machine-readable storage medium of claim 6, wherein the instructions upon execution cause the system to:
   update the ensemble of machine-learning models for the given analytics module based on features extracted from additional event data, wherein the updating is performed iteratively as the additional event data is continually received.

8. The non-transitory machine-readable storage medium of claim 1, wherein the instructions upon execution cause the system to:
partition the extracted features across a plurality of partitions that correspond to different respective entities of the computing environment.

9. A system comprising:
at least one processor;
a plurality of different types of analytics modules executable on the at least one processor to apply different types of techniques for detecting anomalous entities in a computing environment; and
a plurality of ensembles of machine-learning models, each respective ensemble of machine-learning models associated with a respective analytics module of the plurality of different types of analytics modules, the respective analytics module to use the respective ensemble of machine-learning models to detect an anomalous entity in the computing environment based on features extracted from event data representing events in the computing environment, wherein the different types of analytics modules are associated with respective different priorities based on different time scales used by the different types of analytics modules, wherein execution of the different types of analytics modules are according to the respective different priorities, and wherein a first analytics module of the different types of analytics modules is given a higher priority in access of system resources than a second analytics module of the different types of analytics modules responsive to the first analytics module being associated with a higher priority than the second analytics module.

10. The system of claim 9, wherein the first analytics module is executable to:
aggregate anomaly scores produced by machine-learning models of a first ensemble of machine-learning models, to generate an aggregated anomaly score, the first ensemble of machine-learning models being an ensemble of the ensembles of machine-learning models; and
detect the anomalous entity using the aggregated anomaly score.

11. A method comprising:
extracting, by a system comprising a hardware processor, features from event data representing events in a computing environment;
training, by the system using the extracted features, ensembles of machine-learning models for respective analytics modules of a plurality of different types of analytics modules;
assigning, by the system, different priorities to the respective analytics modules of the different types of analytics modules, wherein the different priorities are based on different time scales used by the different types of analytics modules; and
detecting, by the different types of analytics modules using the respective trained ensembles of machine-learning models, an anomalous entity in response to further event data, wherein the different types of analytics modules perform checking for the anomalous entity according to time scales of the different time scales, and wherein a first analytics module of the different types of analytics modules is given a higher priority in access of system resources than a second analytics module of the different types of analytics modules responsive to the first analytics module being assigned a higher priority than the second analytics module by the assigning.

12. The method of claim 11, wherein the different types of analytics modules comprise analytics modules selected from among a graph-based analytics module, a deep learning analytics module, and a profile-based analytics module.

13. The non-transitory machine-readable storage medium of claim 1, wherein the first analytics module is to use a first time scale of the different time scales by re-iterating analytics of the first analytics module for identifying anomalous entities every time interval represented by the first time scale, and wherein the second analytics module is to use a second time scale of the different time scales by re-iterating analytics of the second analytics module for identifying anomalous entities every time interval represented by the second time scale.

14. The system of claim 9, wherein the first analytics module is to use a first time scale of the different time scales by re-iterating analytics of the first analytics module for identifying anomalous entities every time interval represented by the first time scale, and wherein the second analytics module is to use a second time scale of the different time scales by re-iterating analytics of the second analytics module for identifying anomalous entities every time interval represented by the second time scale.

15. The system of claim 9, wherein the different types of analytics modules comprise analytics modules selected from among a graph-based analytics module, a deep learning analytics module, and a profile-based analytics module.

16. The method of claim 11, wherein the first analytics module uses a first time scale of the different time scales by re-iterating analytics of the first analytics module for identifying anomalous entities every time interval represented by the first time scale, and wherein the second analytics module uses a second time scale of the different time scales by re-iterating analytics of the second analytics module for identifying anomalous entities every time interval represented by the second time scale.

17. The system of claim 9, further comprising:
model training instructions executable on the at least one processor to train the plurality of ensembles of machine-learning models using features extracted from further event data representing events in the computing environment.

18. The system of claim 17, wherein the model training instructions are executable on the at least one processor to:
aggregate the further event data in a specified time interval to produce aggregated event data; and
extract the features for training the plurality of ensembles of machine-learning models from the aggregated event data.

19. The system of claim 9, further comprising:
a pluggable framework to enable addition of an additional analytics module.

20. The system of claim 19, wherein the pluggable framework comprises an interface to support creation of the additional analytics module.

21. The system of claim 9, wherein the different types of analytics modules are to check for presence of anomalous entities using respective time sales of the different time scales.

* * * * *